Figure 1:
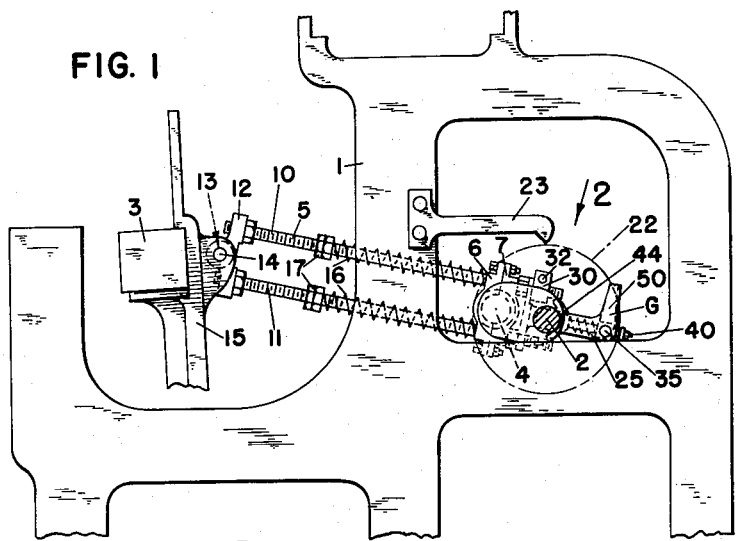

May 15, 1956 C. R. KRONOFF ET AL 2,745,185
LOOM GAUGE
Filed Feb. 20, 1953

INVENTORS
CLARENCE R. KRONOFF
ALBERT H. TAYLOR JR.

Chas. T. Hawley
ATTORNEY

United States Patent Office 2,745,185
Patented May 15, 1956

2,745,185

LOOM GAUGE

Clarence R. Kronoff, Worcester, and Albert H. Taylor, Jr., Shrewsbury, Mass., assignors to Crompton & Knowles Loom Works, Worcester, Mass., a corporation of Massachusetts Application February 20, 1953, Serial No. 337,953

7 Claims. (Cl. 33—181)

This invention relates to improvements in gauges more particularly for use in aligning the axes of a shaft, its wrist pin, and a pivot pin between a connector on the wrist pin and a part of the machine to be operated by the connector.

In order that various parts of a machine may be properly timed with each other it is desirable to have an exact starting point for the cycle of operations fixed by a predetermined relation of the driving means and at least one other part of the machine. In some types of machines it is difficult to determine the starting point visually without the use of some form of gauge. As an example, mention may be made of a loom driven by a crank shaft and having a lay which is reciprocated by a connector pivoted to the lay and the wrist pin of the shaft. Several mechanisms of the loom operate successively and should be timed in correct order, but in the past no convenient way has been found for accurately determining a starting point, such as the so-called front center position of the lay when the axes of the shaft, wrist pin, and the pivot pin on the lay for the connector are in line.

Experience has shown that those who have had extended experience in loom operation will make errors of from 4° to 9° in the angular position of the crank shaft when attempts are made to place the lay at front center. The loom may have a degree wheel and a pointer which should register with the zero mark of the wheel when the lay is on exact front center, but errors will result from the setting of the loom by the wheel unless the lay is actually on front center when the pointer is at zero on the degree wheel.

It is an important object of the present invention to provide a gauge having a support member which can be attached to the connector and having also a rockable member rotatable on the support member so arranged that its angular position can be determined by the crank shaft. Indicia on the two members can then be caused to register with each other when the axes of the shaft, wrist pin and connector pivot pin on the lay are aligned. This condition of alignment occurs when the lay is on exact front center, and the pointer can then be set to register with the zero of the degree wheel.

It is a further object of the invention to provide the aforesaid rockable member with a centering element having diverging or angular wings which are engaged by the shaft so that the latter is one of the factors that determine the angular position of the rockable member with respect to the support member.

It is a still further object of the invention to mount the support member on the connector in such manner that the axis of the rockable member will be parallel to and in a plane with the axes of the wrist pin and the lay connector pivot pin on the lay. With the centering element engaged with the shaft which provides a fourth axis the shaft can be turned and the two members will move angularly with respect to each other until all four axes already mentioned are in the same plane. At this time the indicia will register and the pointer can be set at the zero mark on the degree wheel.

It is a more detailed object of the invention to make the centering element slidable on the rockable member and held against the shaft by a spring or the like so that the rockable member will be held in correct position with respect to the shaft as the latter is turned.

It is a more specific object of the invention to provide a gauge adaptable for use with a crank connector having two spaced parallel rods which fit bearings on one part of the gauge to determine the angular position of said part and also of the rockable member and centering element relative to the axis of the shaft.

Figure 5:
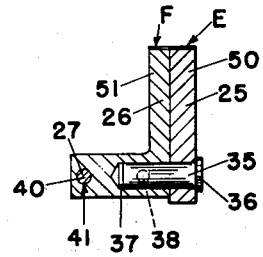
Figure 2:
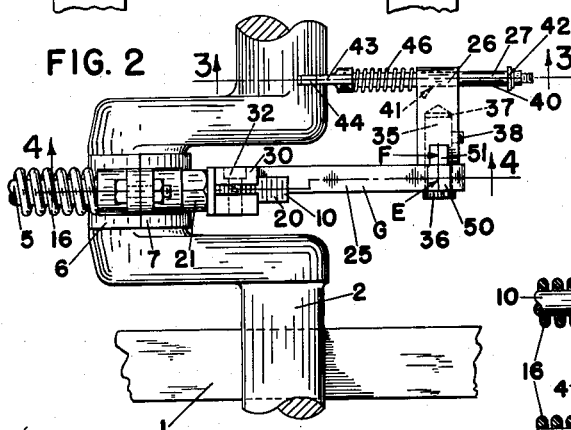
Figure 3:
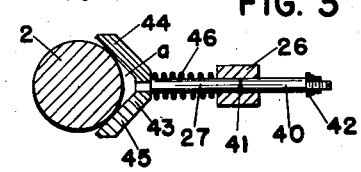
Figure 4:
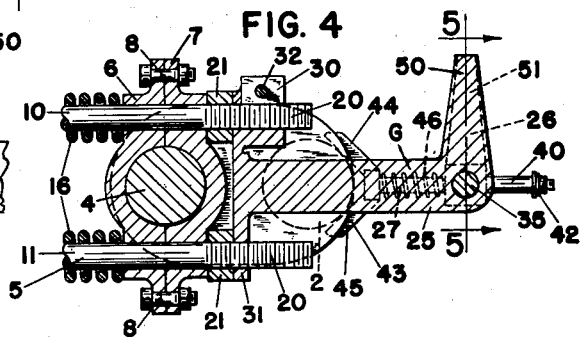
Figure 6:
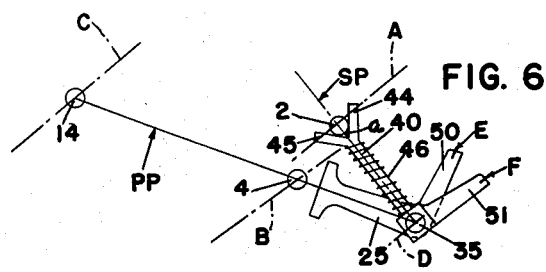

In order that the invention may be clearly understood reference is made to the accompanying drawings which illustrate by way of example the embodiments of the invention and in which:

Fig. 1 is a side elevation of a loom having the invention applied thereto and showing the lay on front center position, Fig. 2 is an enlarged detail plan view looking in the direction of arrow 2, Fig. 1, Fig. 3 is a vertical section transverse of the crank shaft taken on line 3—3, Fig. 2, showing the centering element in engagement with the crank shaft, Fig. 4 is a vertical section transverse of the wrist pin and shaft taken on line 4—4, Fig. 2, showing the position of parts of the gauge when the lay in on front center, Fig. 5 is a detail vertical section on line 5—5, Fig. 4, and Fig. 6 is a diagrammatic view illustrating the manner in which the invention is used.

The invention will be described in connection with a loom, but it is to be understood that the gauge set forth herein is not limited in its use to looms. Referring more particularly to Fig. 1, the loom frame 1 supports a crank shaft 2 in usual manner, as by bearings not shown herein, and has a lay 3 constituting a part of the loom to be reciprocated. The crank shaft has wrist pins one of which is shown at 4 for pivotal connection to the rear end of a lay connector designated generally at 5. The rear end of the connector, the part adjacent to shaft 2, is made with split bearing parts 6 and 7 which are bolted together as at 8 and these bearing parts as shown herein are slidable on upper and lower rods 10 and 11 of the connector. The plane of the rods is preferably at right angles to the axis of the crank shaft. The forward end of the connector has a cross bearing 12 secured to the front ends of the rods 10 and 11 and provided with a bore 13 to fit a pivot pin 14 carried by the sword 15 of the lay 3.

Springs 16 surround the rods 10 and 11 and their forward ends engage nuts 17 on the rods. The reason for the springs is to permit some slight yielding between the lay and the wrist pin in the event that the lay is stopped abruptly during loom operation, but it is to be understood that the springs may be omitted and a form of rigid bearing be provided on the rear end of the connector 5 for the wrist pin. The rear ends of the rods are provided with screw threads 20 and nuts 21 which are held by the springs against the bearing part 7, and the threaded ends of the rods 10 and 11 will ordinarily project rearwardly or to the right of the nuts 21, as shown in Fig. 4.

The part of the loom thus far described is of common construction and during rotation of shaft 2 the lay 3 will be reciprocated between its front and back center positions and it is to be understood that several other mechanisms not shown herein but forming usual parts of a loom will come into action at different times during complete rotation of shaft 2. The shaft may have secured thereto a degree wheel 22 indicated diagrammatically in dot and dash lines in Fig. 1 and the loom may also have a pointer 23 mounted thereon for registry with the various degree marks on the wheel 22.

In carrying the invention into effect the gauge, designated generally at G, comprises an elongated support member 25, a rockable member 26, and a centering element 27. The support member 25 is provided with upper and lower bearings 30 and 31 which fit snugly around the rods 10 and 11, respectively, to fix the position of the support member with respect to the connector 5. The upper bearing 30 may be of the split type as suggested in Fig. 4 so that it can be clamped to the top rod 10 by a bolt 32. When the bolt is tightened the support member 25 will be attached rigidly to the connector and will move with the latter as the wrist pin 4 revolves around the crank shaft.

The support members is provided with a pivot stud 35 for the rockable member 26. The stud may have a head 36 engaging one side of the support member and projects beyond the opposite side thereof and fits closely into a bore 37 in the rockable member 26. A set screw 38 in the rockable member may be screwed tightly against pivot stud 35 to prevent play between members 25 and 26. The axis of the pivot stud and therefore of the rockable member is parallel to the axis of the shaft 2 when the gauge is clamped to the connector as already described, and this axis is also in a primary plane represented by line PP, Fig. 6, passing through the axes of the wrist pin and the pivot pin 14. It will be understood that the axes of the crank shaft 2, wrist pin 4, and pin 14 are parallel and that the axis of the rockable member is parallel to these axes. The two rods 10 and 11 determine the angular position of the support member and assist in holding the axis of stud 35 in the parallel relationship mentioned.

The centering element 27 comprises a stem 40 slidable in a bore 41 in the rockable member 26 in such manner that the axis of the stem, or its line of sliding, passes through the axis of the pivot stud of rockable member 26 and is preferably though not necessarily perpendicular to the last named axis. The right end of the stem 40 has a stop nut 42 thereon for engagement with the rockable member 26 to limit left hand motion of the centering element as viewed in Fig. 3. The left end of stem 40 has secured thereto a head 43 provided with two wings 44 and 45 which diverge from the stem to define an angle designated generally at $a$. The bisector of this angle coincides with the axis of the stem 40 and therefore passes through the axis of the rockable member 26. A compression spring 46 between the rockable member 26 and the head 43 tends normally to move the latter away from the rockable member but permits the head to move toward the rockable member 26, as will be apparent from Fig. 3.

Each of the members 25 and 26 has an index line fixed on the member. An upright arm 50 on the support member 25 has an index line E and a second upright arm 51 on the rockable member 26 has an index line F. These lines or marks E and F can be made to register with each other when a critical angular relation exists between the support and rockable members, as will be described more fully hereinafter.

In the operation of the gauge it may be assumed that it has been fastened to the crank connector 5 as already described and that the support and rockable members and the centering element are in some such position as indicated diagrammatically in Fig. 6. In this figure the axes of the crank shaft, the wrist pin, the pivot pin 14 on the lay and the pivot stud 35 are indicated respectively by the dot and dash diagonal lines A, B, C and D. The axes C, B and D are in the aforesaid primary plane PP, while the axes A and D determine a secondary plane SP. The spring 46 will keep the wings 44 and 45 in contact with the crank shaft so that the bisector of angle $a$, lying in plane SP, will pass through the axis A. In the position assumed in Fig. 6 the arms 50 and 51 of the support and rockable members, respectively, will be separated angularly so that their primary and secondary index lines E and F respectively will be spaced apart.

As the crank shaft is turned in a clockwise direction as viewed in Fig. 2 the wrist pin will rise, as will also the pivot stud 35, as the lay moves forwardly and the primary and secondary planes will approach each other. These planes both pass through the pivot stud 35 and when, due to turning of the crank shaft, axes A, B and C move into the same plane then the secondary plane will coincide with the primary plane and the lay will be in its extreme forward or front center position with the axis C at its maximum distance from axis A.

The marks E and F are so placed on their respective members that at this time they will be aligned or in register, as indicated for instance in Fig. 2, and the operator will know by their registry that the lay is on front center position and that an adjustment can be made to bring the pointer 23 in line with the zero mark of the degree wheel 22. This adjustment may be made by moving either the degree wheel 22 or the pointer 23, as the case may be. The gauge can then be removed and the various mechanisms of the loom or other machine can be timed according to the degree wheel and the pointer.

The parts of the gauge are so related that the index marks E and F will be moving at a relatively high rate with respect to each other when the axis B approaches a line joining axes A and C, but at this time axis C will be moving at a very slow rate relative to axis A. When the index lines approach each other, therefore, a small error made in visually determining their registry will be reflected by a very much smaller error in the position of axis C relative to axis A.

From the foregoing it will be seen that the invention sets forth a simple form of loom which when attached to a crank connector enables an operator to determine when the axes of the crank shaft, the wrist pin and the lay carried pivot pin 14 are in a plane, and while this condition exists as indicated by the registry of lines E and F the degree wheel 22 can be moved relatively to the pointer to establish a zero starting point for settings of the loom parts. It will be seen that the support member 25 is readily attachable to the connector 5 and when fixed with respect to the latter the pivot stud 35 will have its axis in the primary plane PP which includes axes B and C. During the turning of the crank shaft the head 43 will remain in engagement with the crank shaft due to the spring 46, and as the stem 40 slides with respect to the rockable member the bisector of the angle $a$ will continue to pass through the axis D. While a particular form of connector 5 has been shown the invention is not necessarily limited to such a connector, although it is desirable that the latter be of such form that the support member can be rigidly attached to it in such manner as to locate axes B, C and D in a plane. When the connector is made with the two rods 10 and 11 they will determine the angular position of the support member relative to the connector. The axis of the stem 40 has been described hereinbefore as being perpendicular to the axis of the pivot stud 35, but this is not necessary in all forms of the invention. It is desirable that even though the stem 40 be somewhat oblique with respect to the crank shaft its axis should pass through the axis of the pivot stud 35. The stem 40 has been made round for convenience and it can therefore turn to change the plane of the angle $a$, but it is desirable when making a setting to keep the plane of the angle as near as possible vertical if the axis of the crank shaft is horizontal. In one aspect of the invention the rockable member 26 and centering element 27 can be considered as a unitary rockable element movable about a pivot stud provided by the support member 25.

Having now particularly described and ascertained the nature of the invention and in what manner the same is to be performed, what is claimed is:

1. In a gauge for a loom having a part to be reciprocated provided with a pivot pin, a connector one end of which is supported by and movable angularly on said pivot pin, a crank shaft the axis of which is parallel to the axis of said pivot pin, a wrist pin on said shaft the axis of which is parallel to the axis of the shaft, a support member rigidly attached to the connector, a rockable member swingable on the support member about an axis which is parallel to the axes of the crank shaft and the wrist pin and in a plane including the axes of the wrist pin and the pivot pin, a centering element slidable on said rockable member having two shaft engaging wings defining an angle, said element being slidable on said rockable member in such a direction that the bisector of the angle passes through said axis of the rockable member for all sliding positions of the element relative to the rockable member, and indicia on said members which register with each other when said bisector is in a plane including said axis of the rockable member and the axis of the wrist pin.

2. In a gauge for a loom having a part to be reciprocated provided with a pivot pin, a connector one end of which is supported by and movable angularly on said pivot pin, a crank shaft the axis of which is parallel to the axis of said pivot pin, a wrist pin on said shaft the axis of which is parallel to the axes of said pivot pin and shaft, a support member removably secured to the connector, a rockable member swingable on the support member about an axis which is parallel to the axes of the crank shaft and of the wrist pin and in a plane including the axes of the wrist pin and the pivot pin, a centering element slidable on said rockable member along a line passing through the axis of the rockable member and having two shaft engaging wings defining an angle the bisector of which passes through said axis of the rockable member for all sliding positions of the element along said line, and indicia on said members which register with each other when said bisector is in a plane determined by the axes of the rockable member and the wrist pin.

3. The gauge set forth in claim 2 wherein the centering element comprises a stem slidable on the rockable member and a spring around the stem acts to hold the wings against the crank shaft.

4. The structure set forth in claim 2 wherein the centering element slides on the rockable member along a line at right angles to the axis of the rockable member.

5. In a gauge for a loom having a part to be reciprocated provided with a pivot pin for one end of a connector the other end of which is pivoted to the wrist pin of a crank shaft the axis of which is parallel to the axis of the wrist pin, an elongated support member adapted at one end thereof for rigid attachment to the connector, a rockable member swingable on the other end of the support member about an axis which is parallel to the crank shaft and wrist pin and in a plane including the axes of the wrist pin and the pivot pin when the support member has said one end thereof attached to said connector, a centering element slidable on said rockable member along a line which passes through the axis of the rockable member and having two shaft engaging wings defining an angle the bisector of which coincides with said line, an arm rigid with said support member extending away from said axis of the rockable member and having thereon an index line, and a second arm on the rockable member adjacent to the first arm which having thereon a second index line which registers with the first index line when said bisector is in a plane determined by the axis of the rockable member and the axis of the wrist pin.

6. In a gauge for a loom having a part to be reciprocated provided with a pivot pin, a connector one end of which is supported by and movable angularly on said pivot pin and comprising two spaced parallel rods, a crank shaft the axis of which is at right angles to the plane of said rods and is parallel to the axis of said pivot pin, a wrist pin on said shaft the axis of which is parallel to the axis of the shaft, a support member having two bearings, one for each of said rods, fitting said rods and having the angular position thereof determined by said rods, means on at least one of said bearings securing the support member to a rod of the connector, a rockable member swingable on the support member about an axis which is parallel to the axis of the wrist pin and in a plane including the axes of the wrist pin and the pivot pin, a centering element slidable on said rockable member along a line passing through the axis of the rockable member and having two shaft engaging wings defining an angle the bisector of which passes through said axis of the rockable member for all sliding positions of the element relative to said rockable member, and indicia on said members which register with each other when said bisector is in a plane determined by the axes of the rockable member and of the wrist pin.

7. In a gauge for a machine having a part to be reciprocated provided with a pivot pin, a connector one end of which is supported by and movable angularly on said pivot, a crank shaft the axis of which is parallel to the axes of said pivot pin, a wrist pin on said shaft the axis of which is parallel to the axis of the shaft, a support member secured to the connector, means on the support member providing a pivot the axis of which is in a primary plane defined by the axes of said pivot pin and wrist pin and is parallel to the axis of the wrist pin, a unitary rockable member mounted for swinging movement relative to the support member about said pivot on the latter, a head on said rockable member having wings disposed at an angle to each other and engaging the crank shaft, the bisector of said angle lying in a secondary plane determined by the axis of the shaft and the axis of said pivot on the support member, and indicia the positions of which are determined one by said support member and the other by said rockable member to be brought into register with each other when the wrist pin and gauge move relatively to the crank shaft to such a position that said primary and secondary planes coincide.

References Cited in the file of this patent

UNITED STATES PATENTS

| | | |
|---|---|---|
| 1,387,533 | Eisele | Aug. 16, 1921 |
| 1,461,083 | Damerell | July 10, 1923 |
| 1,554,610 | Webster | Sept. 22, 1925 |
| 1,839,596 | Rouse | Jan. 5, 1932 |
| 2,257,257 | Hoeber | Sept. 30, 1941 |
| 2,318,256 | Oliver | May 4, 1943 |